United States Patent [19]

Watanabe et al.

[11] Patent Number: 5,522,056
[45] Date of Patent: May 28, 1996

[54] CACHE MEMORY WITH PLURALITY OF CONGRUENCE SETS AND SENSE AMPLIFIERS SHARED AMONG THE CONGRUENCE SETS

[75] Inventors: Tetsuya Watanabe; Akira Yamada, both of Itami, Japan

[73] Assignee: Mitsubishi Denki Kabushik Kaisha, Tokyo, Japan

[21] Appl. No.: 101,800

[22] Filed: Aug. 3, 1993

Related U.S. Application Data

[63] Continuation of Ser. No. 604,023, Oct. 25, 1990, abandoned.

[30] Foreign Application Priority Data

Nov. 1, 1989 [JP] Japan .................................. 1-286181

[51] Int. Cl.⁶ ..................................................... G06F 12/00
[52] U.S. Cl. ..................... 395/455; 395/445; 364/DIG. 1
[58] Field of Search .................................. 364/200, 900; 395/425, 455, 445

[56] References Cited

U.S. PATENT DOCUMENTS

| | | | |
|---|---|---|---|
| 4,463,420 | 7/1984 | Fletcher et al. | 395/460 |
| 4,513,367 | 4/1985 | Chan et al. | 395/472 |
| 4,905,188 | 2/1990 | Chuang et al. | 395/455 |
| 5,014,195 | 5/1991 | Farrell et al. | 395/455 |
| 5,091,851 | 2/1992 | Shelton et al. | 395/455 |
| 5,133,061 | 7/1992 | Melton et al. | 395/455 |

OTHER PUBLICATIONS

L. Liu "XOR Randomization in Cache Congruence Class Indexing" IBM Technical Disclosure Bulletin, vol. 27, No. 2 (Jul. 1984), p. 1097.
Interface, No. 123, Aug. 1987, CQ Publication.

*Primary Examiner*—Tod R. Swann
*Assistant Examiner*—James Peikari
*Attorney, Agent, or Firm*—Townsend and Townsend and Crew; Philip H. Albert

[57] ABSTRACT

A cache memory with a data memory divided into a plurality of word arrays, each of which is selectable by a word select indicator. Each word array is further divided into a plurality of bit array, each of which correspond to a bit of a word, and include congruence set memories for each congruence set. A bit array is connected to a sense amplifier via a congruence set selector, thereby one set of congruence set memories of the word arrays in the data memory is selected, and one congruence set memory is selected from each of the bit arrays by a congruence set selector to be connected with a sense amplifier, so that only one sense amplifier has to be provided for each bit in each word in an entry of the data memory, thus eliminating the need to increase the number sense amplifiers as the number of congruence sets increases. Furthermore, as only the sense amplifier associated with the selected word array is operational, current consumption is reduced.

5 Claims, 3 Drawing Sheets

CACHE MEMORY WITH PLURALITY OF CONGRUENCE SETS AND SENSE AMPLIFIERS SHARED AMONG THE CONGRUENCE SETS

This is a continuation of application Ser. No. 07/604,023, field Oct. 25,1990, now abandoned.

BACKGROUND OF THE INVENTION

1. Field of the Invention

The present invention relates to a cache memory organized as a set-associative cache.

2. Description of the Related Art

Main memory access times are often the limiting factor in attempts to increase processing speed in a microprocessor. Generally speaking, a main memory has a large capacity, but a relatively low speed. The memory access speed if often increased through the use of a device known as a cache memory.

FIG. 1 is a block diagram showing a general-purpose microprocessor which uses a cache memory. Reference numeral 11 denotes a data processor (CPU), 12 a main memory, and 13 a cache memory.

The cache memory is a buffer memory which operates at high speed and prestores data from part of main memory 12. Where a data access is in response to a request from the data processor and the data to be accessed is stored in cache memory 13, the data access is carried out not using main memory 12, but using cache memory 13. Accordingly, data accesses are relatively quicker when cache memory 13 contains the desired data.

Furthermore, the data which can be stored in cache memory 13 is not limited, but data from an optional area of main memory 12 can be stored in response to a request from data processor 11.

There are various configurations for a cache memory, one of which is the four-way, set-associative cache memory.

A description, referring to FIG. 2, will now be given for a four-way, set-associative cache memory system described in a publication entitled "An Outline and Way to Put to Practical Use of One Chip Cache Memory μPD43608R", (Interface, No. 123, August 1987, p. 241-57).

In FIG. 2, reference numeral 1 shows an address (requested address) in main memory 12 of data to be accessed which is requested by data processor 11. The address comprises, from high to low order bits, an address tag 1a, a congruence class select field 1b, and a word select field 1c.

Reference numeral 2 denotes an address tag memory comprised of M entries. Address tag memory 2 stores an address tag 1a of a requested address 1 in each entry. Four address tag memories 2 are provided, corresponding to the four "ways", or congruence sets, of the cache.

Reference numeral 3 denotes a valid bit field memory comprising M entries, each valid bit field corresponding to an address tag memory entry. A valid bit field contains data indicating the validity or invalidity of data stored in a corresponding address tag memory 2 entry. Four valid bit field memories 3 are provided, corresponding to the four congruence sets of the cache.

Reference numeral 4 denotes a data memory comprising M congruence classes, each congruence class containing data from an area of main memory 12 indicated by address tag 1a stored in a corresponding address tag memory 2. Four data memories 4 are provided, corresponding to each of the four congruence sets of the cache.

The area of main memory 12 indicated by address tag 1a usually comprises a plurality of addresses, and a plurality of data are stored in each congruence class memory of each data memory 4. In this example, four words of data are stored for each congruence class.

Reference numeral 5 denotes a word selector, which selects one word from four words output by data memory 4 from the entry of data memory 4 selected by a word select field 1c from a requested address 1. Word selector 5 outputs the selected word to a congruence set selector 9. Four word selectors 5 are provided, corresponding to each of the four congruence sets of the cache.

Congruence set selector 9 selects one word from the words output from the four word selectors 5, and outputs the selected word to a data bus 10.

An address tag comparator 8 compares an address tag 1a of the requested address 1 with the data (address tag) stored in each congruence set entry of the address tag memory 2 for the selected congruence class. Where the comparison finds a matching address tag, address tag comparator 8 outputs a HIT signal. Four address tag comparators 8 are provided, corresponding to the four address tag memories 2. A congruence set selection signal is output to congruence set selector 9 from address tag comparator 8 indicating which comparison result was matched.

The operation of the cache memory of such a conventional four-way, set-associative system is as follows.

In the requested address 1, address tag 1a is input to address tag comparator 8, congruence class select field 1b is input to address tag memory 2 and to data memory 4, and word select field 1c is input to word selector 5.

An address tag of an address of data requested by data processor 11 is contained in each entry of address tag memory 2 and a data block of four words read from that address in main memory 12 is stored in data memory 4.

An access of the address tag memory 2 and the data memory 4 is carried out by specifying the address of the entry in the congruence class select field 1b. In other words, the address tag stored in the address tag memory 2 entry selected by congruence class select field 1b is passed to address tag comparator 8, and the data memory 4 entry selected by congruence class select field 1b is passed to word selector 5.

Word selector 5 selects a word from the four words stored in the selected data memory 4 entry according to the word select field 1c, and outputs the word to congruence set selector 9. Address tag comparators 8 compare the address tag 1a of the requested address 1 being requested by the data processor 11 with the address tags read from the selected entries of address tag memory 2, and judges whether they match or not. If the tags match, address tag comparators 8 output a HIT signal and a congruence set selection signal to congruence set selector 9.

As aforementioned, since cache memory 13 is a four-way, set-associative cache system, it includes four address tag memories 2, four data memories 4, four address tag comparators 8, four word selectors 5, and four congruence set selectors 9, corresponding to the four congruence sets. Accordingly, address tag memory 2 and data memory 4 are respectively capable of storing a maximum of four address tags and four data blocks for each congruence class. Moreover, as each congruence set operates similarly in parallel, when address tag comparator 8 finds a match (coincidence of address tags), four address tags are addressed at the same time by one address tag entry address. In other words, address tag comparators 8 compare the address tag of each congruence set read from address tag memory 2 with address tag 1a of the requested address 1 requested by data processor 11 at the same time, to detect a cache hit/miss.

On the other hand, one word is selected by word selector 5 from an entry of each congruence set of data memory 4, and congruence set selector 9 outputs one word to data bus 10 according to a congruence set selection signal provided by the address tag comparator 8.

FIG. 3 is a circuit diagram showing a bit cell of data memory 4. In FIG. 3, numeral 14 denotes a word line, 15 a memory cell, and 6 a sense amplifier, One memory cell 15 is connected to one sense amplifier 6 for each entry in data memories 4. For the example of FIG. 2, M memory cells 15 are connected to one sense amplifier 6. The number required of these circuits shown in FIG. 3, which have M memory cells 15 connected to one sense amplifier 6, is the number of bits in one word multiplied by the number of words in a congruence class of data memory 4, and the number of congruence sets in data memory 4.

Accordingly, assuming 32-bit words, and four words per congruence class of data memory 4, for cache memory 13 shown in FIG. 2, the number of sense amplifiers required is 32 (# of bits) ×4 (words/congruence class)×4 (congruence sets), or 512.

In the conventional cache memory, as each bit of each word of each congruence set is provided with a sense amplifier as mentioned above, a large area is required on an integrated circuit chip to implement the sense amplifiers. Therefore, as the capacity of the cache memory increases, so does chip area. Conversely, if available chip area is limited, the capacity of the cache memory must decrease. Also, in a conventional cache memory, data is read out from data memories 4 corresponding to each of the four congruence sets and only data from one of the ways is selected by congruence set selector 9, thus using more current than necessary.

SUMMARY OF THE INVENTION

The present invention has been devised to overcome such problems, and the primary object of the present invention is to provide a cache memory which uses fewer sense amplifiers for a given cache capacity, and also consumes less current for a given capacity.

The another object of the present invention is to provide a cache memory in which common test data can be written into all the congruence sets of a data memory of the cache, to allow for convenient testing.

The cache memory of the present invention is so constructed that a data memory therein is divided into a plurality of word arrays, a particular word array selected by a word selector, and wherein each word array is further divided into a plurality of bit arrays, each bit unit corresponding to the bits of the words in each congruence set. Each of the bit arrays is connected to a sense amplifier via a congruence set selector. In the cache memory of the present invention, one of the word arrays in the data memory is first selected by a word selector, then the bits in the word array corresponding to a selected congruence set selected by the congruence set selector are connected to sense amplifiers. Accordingly, the required number of sense amplifiers is the number of bits in one word multiplied by the number of words per congruence class of the data memory. Thus, the number of sense amplifiers does not increase with an increase in the number of congruence sets. In addition, only the sense amplifiers connected to the selected word array operate, and therefore current consumption is reduced.

The cache memory of the present invention comprises means for writing data into the bits of the data memory corresponding to one congruence set selected by the congruence set selector, and which also allows for the writing of the same data to all of the congruence sets at the same time by setting the means for writing data into the cache memory where all of the congruence sets are selected at the same time by the congruence set selector. Thereby, testing of the data memory is carried out quickly and easily.

The above and further objects and features of the invention will more fully be apparent from the following detailed description with accompanying drawings.

DESCRIPTION OF THE PREFERRED EMBODIMENT

Figure 1:
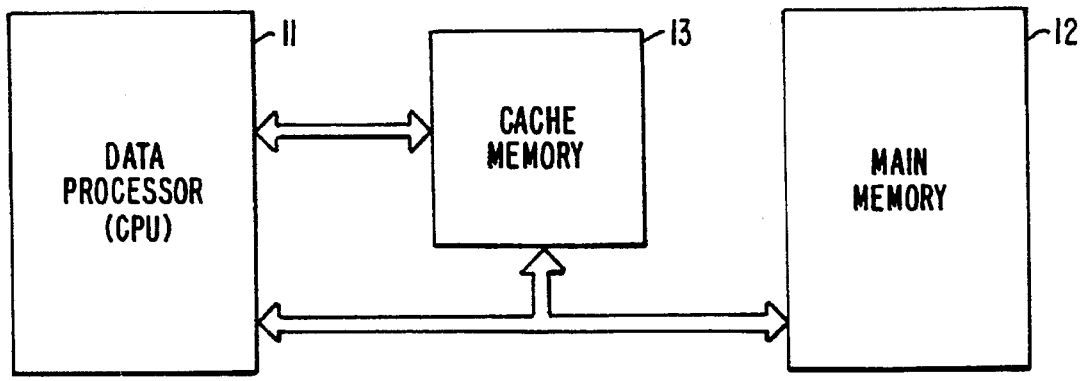
FIG. 1 is a block diagram showing a general-purpose microprocessor using a conventional cache memory.
Figure 3:
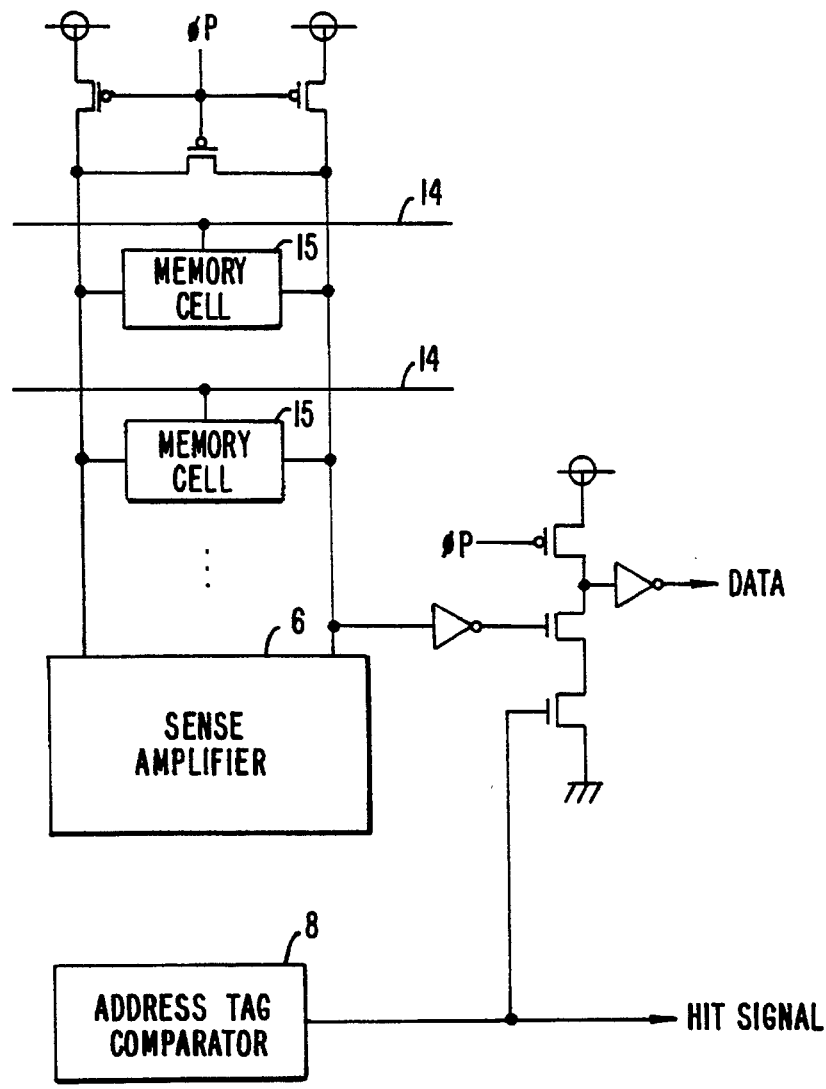
FIG. 3 is a circuit diagram showing a detailed example of part of the data memory of the conventional cache memory.

In the following, the present invention will be described referring to the drawings showing embodiments thereof.

Figure 4:
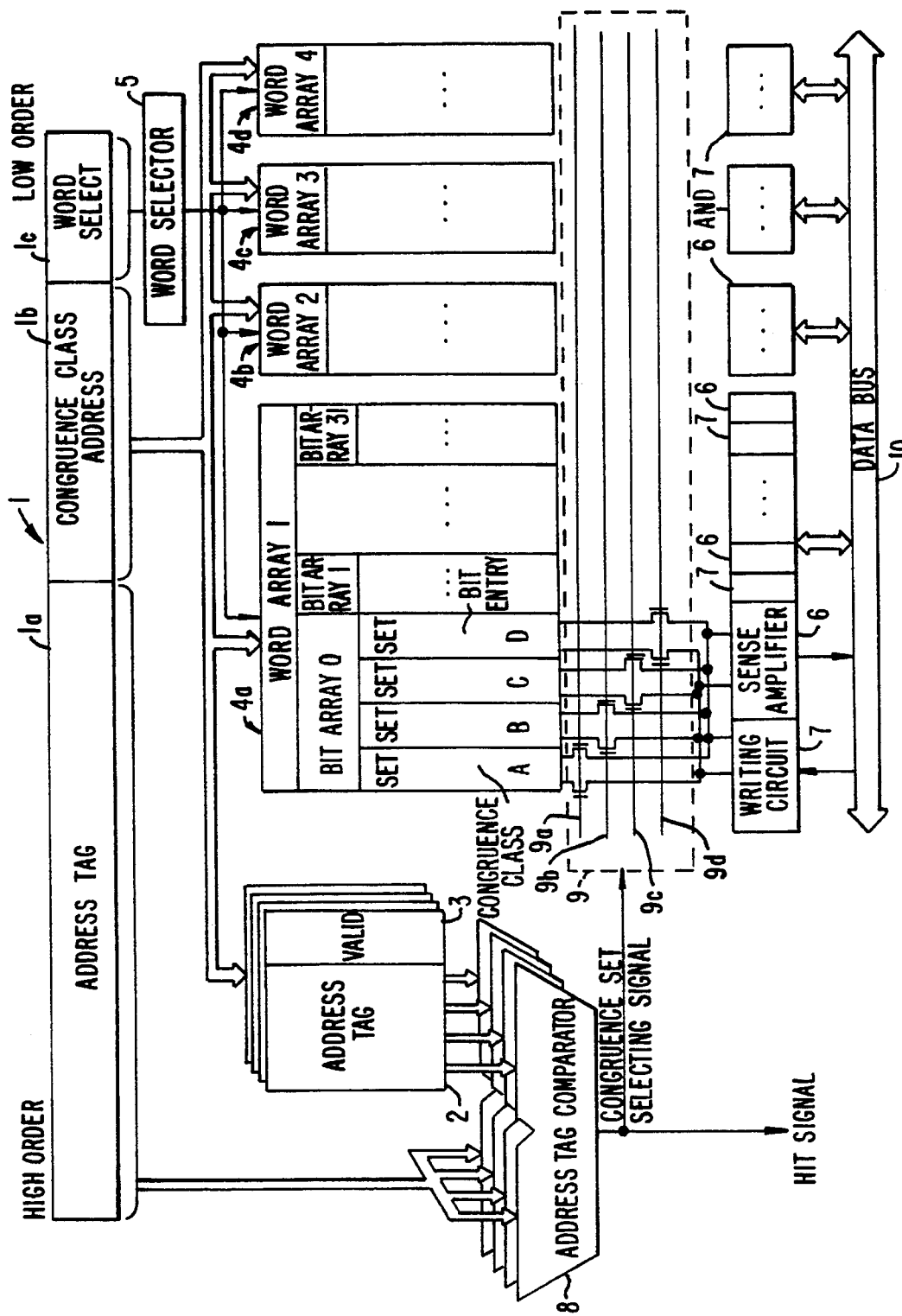
FIG. 4 is a block diagram showing an example of a cache memory according to the present invention.

FIG. 4 is a block diagram showing an example of a cache memory according to the present invention. The cache memory shown is configured as a four-way, set-associative cache system.

In FIG. 4, reference numeral 1 denotes a main memory address (requested address) of data for which an access is requested by data processor 11. The address comprises, from high to low order bits, an address tag 1a, a congruence class select field 1b, and a word select field 1c.

Numeral 2 denotes an address tag memory comprised of M entries. Address tag memory 2 stores an address tag 1a of a requested main memory address 1 in each entry. Four address tag memories 2 are provided, corresponding to the four congruence sets of the cache.

Numeral 3 denotes a valid bit field memory comprising M entries, each valid bit field corresponding to an address tag memory entry. A valid bit field contains data indicating the validity or invalidity of data stored in a corresponding address tag memory 2 entry. Four valid bit field memories 3 are provided, corresponding to the four congruence sets of the cache.

Numeral 4 denotes a data memory comprising M entries. Data memory 4 is divided into four word arrays 4a, 4b, 4c and 4d. Each of the word arrays 4a, 4b, 4c and 4d are divided into bit arrays. A word array comprises storage for 32 bit arrays, which is the length of one word. Each bit array has storage for bits corresponding to each of four congruence sets. FIG. 4 schematically shows that bit array 0 of word array 4a, labelled "word 1", is divided into areas corresponding to congruence set memories A, B, C and D. Each congruence set memory corresponding to one way is divided into M bit entries.

Numeral 5 denotes a word selector. In the cache memory of the present invention, word selector 5 selects and activates one of word units 4a, 4b, 4c and 4d corresponding to one of four words.

Numeral 9 denotes a congruence set selector, in which 5 congruence set selecting lines (four lines in this embodiment) 9a, 9b, 9c and 9d are provided corresponding to each congruence set. The four congruence set selecting lines 9a, 9b, 9c and 9d are selected and activated by a congruence set selection signal to be described later. A congruence set memory unit of each of the congruence set memories 4a, 4b, 4c and 4d is connected to a sense amplifier 6 and a writing circuit 7, to be described later, through respective gates. When congruence set selecting lines 9a, 9b, 9c and 9d are activated to make respective gates turn on, sense amplifiers 6 or writing circuits 7 are connected to the congruence set memories corresponding to the selected congruence set.

Numeral 8 denotes an address tag comparator which compares address tag la of the requested address 1 with the data (address tag) stored in an entry of address tag memory 2 specified by the congruence class select field 1b of each congruence set of the address tag memory 2. When a matching address tag is found, address tag comparator 8 outputs a HIT signal. Four address tag comparators 8 are provided, corresponding to the four address tag memories 2 and the four congruence sets, and a congruence set selection signal is output to congruence set selector 9 from the address tag comparator 8 corresponding to the matching address tag.

A sense amplifier 6 is provided for each bit array of the word arrays 4a, 4b, 4c and 4d, and each sense amplifier 6 outputs to data bus 10 a signal output from the congruence set memory selected by the congruence set selection signal in the bit array corresponding to the sense amplifier, after amplifying the signal.

A writing circuit 7 is provided for each bit array of the word arrays 4a, 4b, 4c and 4d. A writing circuit 7 writes data input from data bus 10 into the congruence set memory selected by the congruence set selection signal in the bit array corresponding to the writing circuit.

Figure 2:
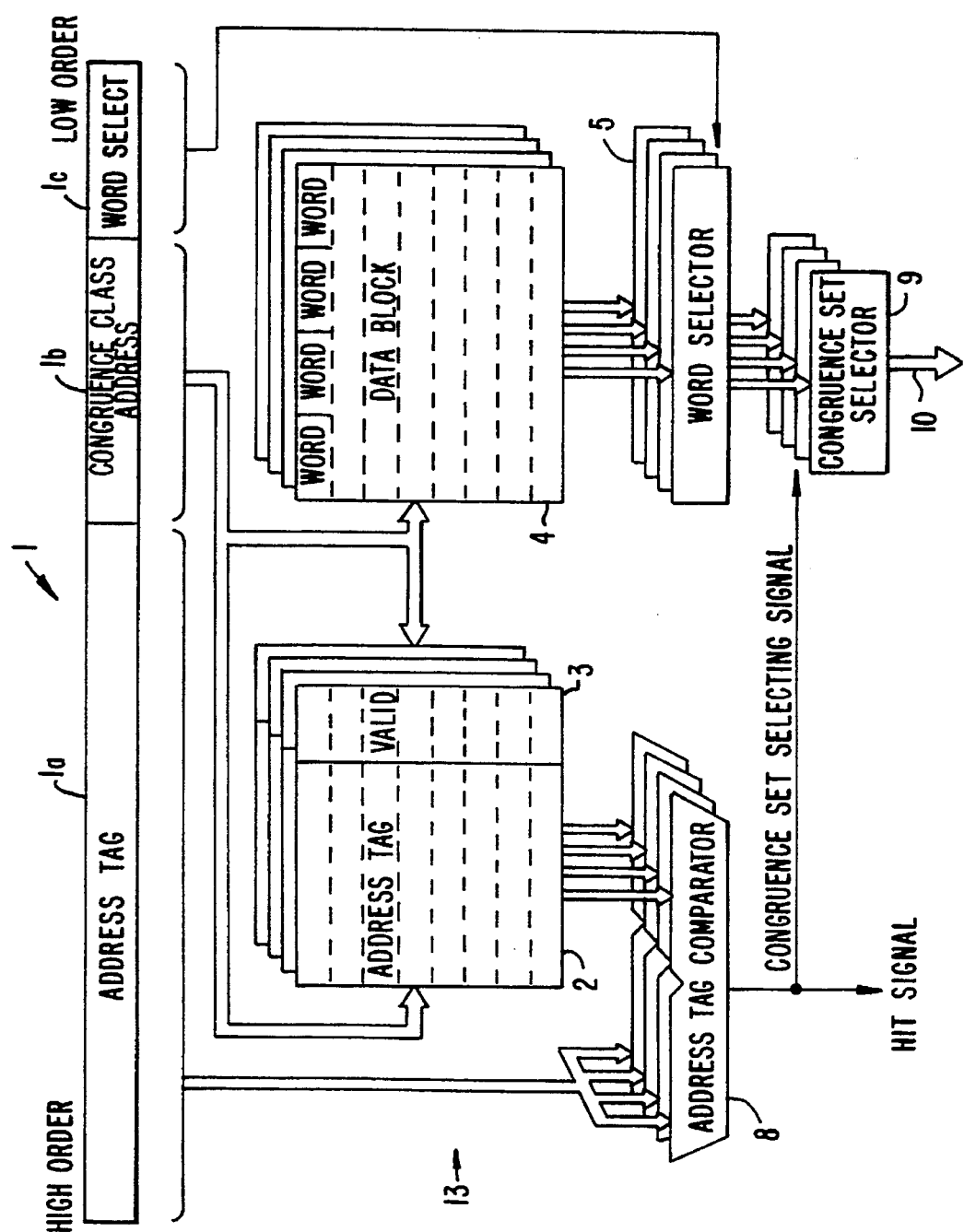
FIG. 2 is a block diagram showing a conventional cache memory.

As the cache memory of the present invention is constructed such that the required number of sense amplifiers is the number of bits in one word multiplied by the number of words per entry, the number of sense amplifiers required in the cache memory shown in FIG. 4, which has the same capacity as the cache memory shown in FIG. 2, is 32×4, or 128. That is, in the cache memory of the present invention, the number of the sense amplifiers 6 is independent of the number, N, of congruence sets, thus the number of sense amplifiers 6 does not increase as the number, N, of congruence sets increases.

The operation of the cache memory in a four-way (N=4), set-associative cache system is as follows.

From the requested address 1, address tag 1a is input to address tag comparator 8, congruence class select field 1b is input to address tag memory 2 and respective word arrays 4a, 4b, 4c and 4d of data memory 4, and word select field 1c is input to word selector 5.

Each entry of address tag memory 2 contains an address of a location in main memory, and data memory 4 contains, in a corresponding entry, four words of data read from that location in main memory.

An access of address tag memory 2 and data memory 4 is done by specifying the address of a congruence class therein in congruence class select field 1b. That is to say, the address tag stored in the entry of address tag memory 2 selected by congruence class select field 1b is passed to address tag comparator 8. One of word arrays 4a, 4b, 4c or 4d of data memory 4 is selected by word selector 5 to be operational.

For example, assuming that congruence set memory 4a corresponding to word 1 is selected by word selector field 1c, and that one entry of word 1, i.e., the data blocks of four congruence sets, is selected by congruence set memory select field 1b.

Meanwhile, address tag comparator 8 compares address tag 1a of the requested address 1 being requested by data processor 11 with the address tags read from address tag memory 2, and judges whether they coincide or not. If address tag 1a coincides with any of the address tags read, address tag comparator 8 outputs a HIT signal and, at the same time, outputs the congruence set selection signal to way selector 9.

As aforementioned, the cache memory of the present invention is a four-way, set-associative system, therefore four address tag memories 2 and four address tag comparators 8 are provided, corresponding to the number of congruence sets. Also, data memory 4 is divided into four word arrays 4a, 4b, 4c and 4d and data corresponding to number of congruence sets exist therein respectively.

Accordingly, address tag memory 2 and data memory 4 are respectively capable of storing up to four address tags and up to four data blocks for a given congruence class. Moreover, as address tag memory 2 operates in set-parallel, when address tag comparator 8 finds a match (coincidence), one entry address addresses the four address tags of the congruence class at the same time. That is, address tag comparator 8 compares the address tag of each congruence set with the address tag 1a of requested address 1 requested by the data processor to four address tags at the same time to judge a cache hit/miss.

Meanwhile, in data memory 4, one of word arrays 4a, 4b, 4c and 4d is selected by word selector 5, and data for the four congruence sets are selected according to an entry address specified by congruence set memory select field 1b.

When congruence set selector 9 receives the congruence set selection signal from address tag comparator 8, congruence set selector 9 activates one of the corresponding congruence set selecting lines 9a, 9b, 9c or 9d. Thereby, as the selected congruence set is connected with sense amplifier 6 and writing circuit 7, data corresponding to the requested address 1 is output from data memory 4, amplified, and output to data bus 10.

By the way, in order to test whether or not the cache memory operates normally, predetermined test pattern data is written into the cache memory and then read out to be compared with the original test pattern data. If the data read out matches the original pattern exactly, the cache memory is judged to be operating normally.

The test operation of a cache memory according to the present invention is as follows. At first, all the congruence sets are selected at the same time. That is, in writing the test pattern data to data memory 4, the test pattern data is input through writing circuit 7 while all of congruence set selecting lines 9a, 9b, 9c and 9d are activated so that all congruence sets are selected at the same time. According to such an operation, as the same data is input into the same entries of each congruence set through writing circuit 7, the same test pattern data is written into an optional data block of that same entry for each congruence set.

When the test pattern data is finished loading, the data is read out from the respective congruence sets and checked for defective bits.

The same number of writing circuits 7 as sense amplifiers 6 are required in the cache memory. Accordingly, though writing circuit 7 was not present in the conventional example, the number of writing circuits required is also reduced in the cache memory of the present invention.

In the embodiment described above, the description was of a cache with four congruence sets, but the present invention can be applied to a cache with any number of congruence sets. If the number of congruence sets is two or more, the same effect can be obtained.

As explained in detail, in a cache memory according to the present invention, the number of sense amplifiers is reduced as compared with the conventional cache memory, and the number of sense amplifiers does not increase when the number of congruence sets increases, the chip area occupied by the sense amplifier is reduced. Accordingly, the capacity of the cache memory can be increased, and a cache memory according to the present invention with the same capacity as a conventional cache memory requires less chip area. In addition, in the cache memory of the present invention, as only the selected word array is operational, the current consumption of the sense amplifiers is reduced. Moreover, as all the congruence sets can be selected simultaneously during testing, the same test pattern data can be written into data memory 4 at the same time, thereby shortening testing time.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A set-associative cache memory, wherein an address comprising an address tag, a congruence class address, and a word select indicator are input to the set-associative cache memory, wherein a data word is output in response to the input address, and wherein the set-associative cache memory uses a set of N congruence classes to store up to N data words for each combination of a congruence class address and a word selected by the word select indicator, the set-associative cache memory comprising:

an address tag memory, coupled to receive the congruence class address, which outputs up to N address tag entries for an address tag memory entry addressed by said congruence class address;

a comparator, coupled to said address tag memory and coupled to receive the address tag, which compares the address tag with said up to N address tag entries and outputs a congruence set selecting signal specifying which, if any, of said N address tag entries match the address tag;

a data memory, coupled to receive the congruence class address and the word select indicator, said data memory comprising a plurality of word arrays, which each comprise a plurality of bit arrays, where a bit array comprises N congruence set memories, each comprising M bit entries addressable by the congruence class address, wherein said data memory outputs a data bit from a bit entry addressed by the congruence class address for each of said N congruence set memories of said plurality of bit arrays in a word array selected by the word select indicator;

a congruence set selector, coupled to said comparator and coupled to said data memory, which inputs data bits output by said data memory and outputs those of said data bits input to said conqruence set selector which are output from congruence set memories selected by said congruence set selecting signal; and a plurality of sense amplifiers, each coupled to a bit output of said congruence set selector to receive selected congruence set signals, wherein each of said plurality of said sense amplifiers amplifies and outputs a bit value of said congruence set signals, thereby using only one sense amplifier for each of said N congruence set memories.

2. A set-associative cache memory as set forth in claim 1, further comprising:

a plurality of writing means, coupled to said congruence set selector, for writing data to each of said plurality of bit arrays of said data memory via said congruence set selector, wherein said plurality of writing means rewrite each bit entry in congruence set memories selected by said congruence set selecting signal; and means, coupled to said congruence set selector, for selecting all N congruence set memories of each bit array simultaneously.

3. A set-associative cache memory as set forth in claim 1, wherein said congruence set selecting signal selects no more than one congruence set selection at any time when outputting data from said data memory.

4. A set-associative cache memory as set forth in claim 1, wherein each of said plurality of sense amplifiers coupled to bit outputs of word arrays not selected by the word select indicator are disabled when outputting data from said data memory.

5. A set-associative cache memory as set forth in claim 1, comprising four word arrays, thirty-two bit arrays per word array, and wherein N, the number of congruence sets, is four, and the number of bit entries per congruence set in a bit array, M, is a power of two.

* * * * *